(12) United States Patent
Pincemin et al.

(10) Patent No.: US 6,456,759 B1
(45) Date of Patent: Sep. 24, 2002

(54) APPARATUS FOR LIMITING NOISE IN THE ZEROS OF RZ OPTICAL SIGNALS

(75) Inventors: Erwan Pincemin, Gommenec'h; Sébastien Bigo, Palaiseau, both of (FR)

(73) Assignee: Alcatel, Paris (FR)

(*) Notice: Subject to any disclaimer, the term of this patent is extended or adjusted under 35 U.S.C. 154(b) by 197 days.

(21) Appl. No.: 09/669,559

(22) Filed: Sep. 26, 2000

(30) Foreign Application Priority Data

Sep. 27, 1999  (FR) ............................................ 99 11991

(51) Int. Cl.[7] .............................. G02B 6/26; G02B 6/27; H04B 15/00
(52) U.S. Cl. .......................... 385/27; 385/11; 359/161
(58) Field of Search ........................................ 385/11

(56) References Cited

U.S. PATENT DOCUMENTS

| | | | |
|---|---|---|---|
| 5,864,421 A | 1/1999 | Suzuki et al. | 359/331 |
| 6,141,129 A | * 10/2000 | Mamyshev | 359/174 |
| 6,341,031 B1 | * 1/2002 | McBrien et al. | 359/237 |

OTHER PUBLICATIONS

Hatami–Hanza, H. et al.: "Demonstration of All Optical Demultiplexing of a Multilevel Soliton Signal Employing Soliton Decomposition and Self–Frequency Shift" IEEE Photonics Technology Letters, US, IEEE Inc. New York, vol. 9, No. 6, Jun. 1, 1997, pp. 833–835, XP000198536.

Islam, M. N. et al.: "Soliton Trapping in Birefringement Optical Fibers" Optics Letters, US, Optical Society of America, Washington, vol. 14, No. 18, Sep. 15, 1989, pp. 1011–1013, XP000065049.

* cited by examiner

*Primary Examiner*—John D. Lee
(74) *Attorney, Agent, or Firm*—Sughrue Mion, PLLC

(57) ABSTRACT

The invention relates to apparatus for limiting noise in the "zeros" of optical RZ signals, the apparatus comprising a birefringent fiber for mutually spectrally offsetting the signals as a function of their intensity, and a filter for filtering the offset signals. The filter attenuates the pulses that correspond to "zeros", but passes the pulses that correspond to "ones". The invention makes it possible to limit the noise in the "zeros" of an RZ signal.

13 Claims, 1 Drawing Sheet

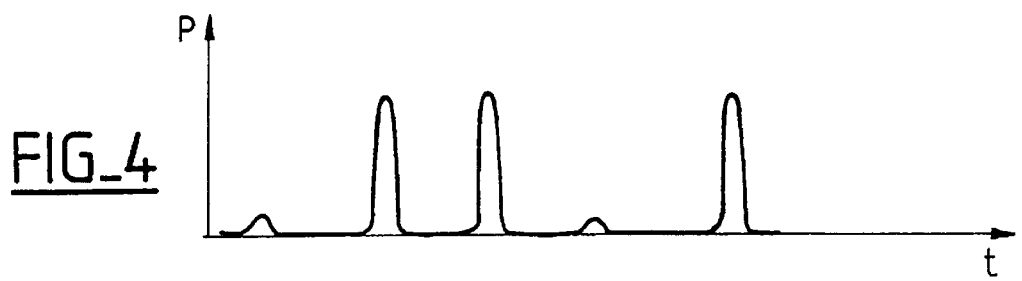
FIG_4
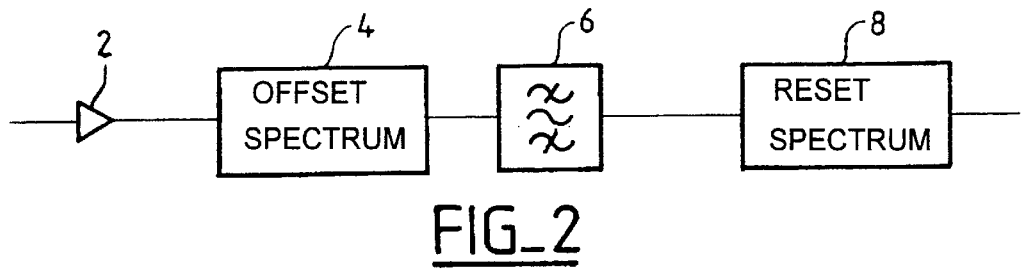
FIG_2
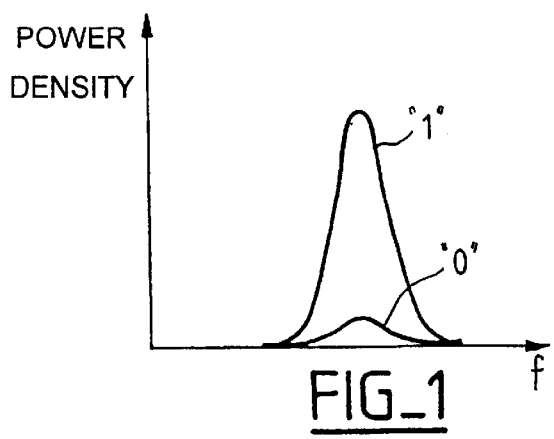
FIG_1
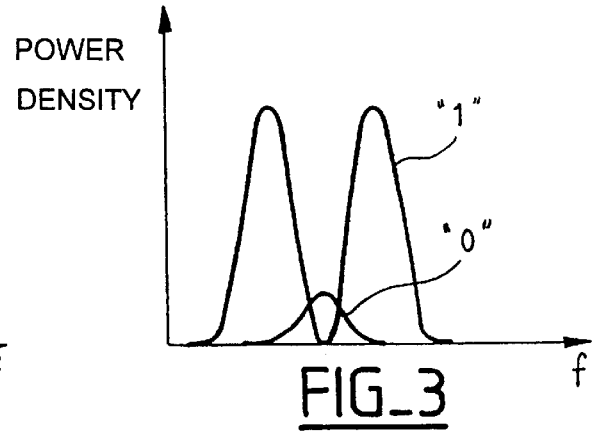
FIG_3
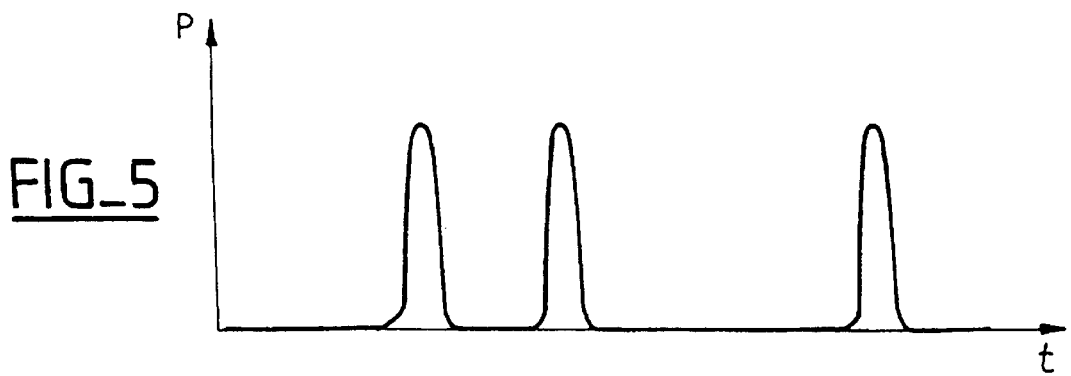
FIG_5

APPARATUS FOR LIMITING NOISE IN THE ZEROS OF RZ OPTICAL SIGNALS

The present invention relates to the field of optical fiber transmission, and more particular to optical regeneration for optical fiber transmission systems. It is particularly applicable to transmission systems for return-to-zero (RZ) signals, such as, for example, transmission systems for soliton signals. The RZ signal corresponding to a high logic value being transmitted is referred to as a "pulse" or a "one", and the absence of signal, corresponding to a low logic value being transmitted, is referred to as a "zero".

BACKGROUND OF THE INVENTION

It is known that soliton pulses or "solitons" can be transmitted in a portion of an optical fiber that has abnormal dispersion. Solitons are pulse signals of $sech^2$ waveform. With such a pulse waveform, the non-linearity in the corresponding portion of the fiber compensates the dispersion of the optical signal. Soliton transmission can be modeled in known manner by the non-linear Schrödinger equation. Proposals have also been made for dispersion-managed soliton transmission systems. In such systems, a dispersion pattern is used that is repeated periodically over thousands of kilometers: a fiber having abnormal dispersion (positive dispersion) succeeds a fiber having normal dispersion (negative dispersion) which almost totally compensates the abnormal dispersion accumulated in the first type of fiber. The signals thus propagate in fibers having high local dispersion but ultimately they undergo mean dispersion that is very low. Such a transmission scheme makes it possible to reduce jitter effects significantly (because of the low mean dispersion), to reduce inter-channel collision effects significantly (because of the high local dispersion), to improve the signal-to-noise ratio, and to increase the spectrum efficiency of the system. Such a system is described, for example, in an article by N. J. Smith and N. J. Doran, Journal of Lightwave Technology, vol. 15, No. 10 (1997), p. 1808 et seq.

It has been proposed to subject soliton signals to synchronous modulation by a clock signal or "clock" to correct their time jitter. Intensity modulation is described, for example, in an article by H. Kubota and M. Nakasawa, IEEE Journal of Quantum Electronics, vol. 29, No. 7 (1993), p. 2189 et seq. An article by N. J. Smith and N. J. Doran, Optical Fiber Technology, 1, p. 218 (1995) proposes phase modulation.

One of the problems encountered in optical fiber transmission systems lies in the distortion to which the optical signals are subjected when they are generated, transmitted, or switched, or more generally, each time they are processed optically in the transmission system. Optical regeneration by intensity modulation aims to solve that distortion problem by applying to each bit a signal whose intensity is at a maximum in the center of the time window for the bit, and of low intensity at the edges of the time window.

Unfortunately, intensity modulation offers a solution that is not entirely satisfactory, in particular in the "zeros" of RZ signals. Noise in the "zeros", i.e. noise in the time windows corresponding to zero bits, or to bits without signals, is not completely eliminated, in particular for transoceanic transmission systems.

C. R. Menyuk, "Stability of solitons in birefringent optical fibers. I: Equal propagation amplitudes", Optical Letters, vol. 12, No. 8, Aug. 1987, proposes a model of the effects of birefringence on the propagation of solitons in single-mode fibers. Birefringence, i.e. the difference in optical index between the two polarization directions of optical fibers, causes a soliton pulse to be separated into two pulses that propagate at different speeds in respective ones of the two polarization directions. That article by C. R. Menyuk shows that, beyond a certain power, the Kerr effect causes time stabilization of the soliton pulses, by phase cross-modulation between the solitons propagating in the two polarization directions. Thus, beyond a certain amplitude, the pulses propagating in both polarization directions move together. The threshold amplitude depends on the birefringence of the fiber.

N. N. Islam et al, "Solitons trapping in birefringent optical fibers", Optics Letters, vol. 14, No. 18, Sep. 1989 proposes an experimental demonstration of trapping orthogonally-polarized solitons in birefringent optical fibers. That demonstration confirms the results announced in the above-mentioned article by C. R. Menyuk.

N. S. Islam, "Ultrafast all-optical logic gates based on solitons trapping in fibers", Optics Letters, vol. 14, No. 18, Nov. 1989, uses trapping of orthogonally-polarized solitons in a birefringent fiber to form logic gates, with inversion, exclusive-OR, or AND functions. At their inputs, those gates receive solitons polarized in respective ones of the polarization directions of a fiber. Those gates use the fact that trapping of the solitons results in the solitons that are propagating in the polarization directions coinciding in time terms. Spectrally, the two trapped pulses undergo a frequency shift of about 1 THz, i.e. about 8 nm at 1550 nm. A filter at the output of the fiber removes the solitons that have undergone such a frequency shift, and makes it possible to obtain an exclusive-OR gate. The filter passes only those solitons which have not undergone any frequency shift, i.e. only those which have propagated alone in the birefringent fiber. A filter at 0.5 THz or 1 THz from the initial frequency of the solitons makes it possible to obtain an AND gate.

OBJECTS AND SUMMARY OF THE INVENTION

The invention proposes a solution to the problem of noise in transmission "zeros". It is particularly applicable to transmission systems for soliton signals.

More precisely, the invention provides apparatus for limiting noise in the "zeros" of optical RZ signals, comprising means for mutually spectrally offsetting the signals as a function of their intensity, and a filter for filtering the offset signals, the attenuation applied by the filter to the signals that correspond to a "zero" value being greater than the attenuation applied by the filter to the signals that correspond to a "one" value.

In one embodiment, the attenuation applied by the filter to the signals corresponding to a "zero" value is at least 6 dB greater than the attenuation applied by the filter to the signals corresponding to a "one" value.

Preferably, the means for spectrally offsetting the signals comprise a birefringent fiber. This fiber may have birefringence of greater than or equal to $1 \times 10^{-5}$.

In one embodiment, the filter is a notch filter centered on the center frequency of the RZ signals.

The apparatus may further comprise an amplifier whose output is connected to the offsetting means.

It is also possible to provide a second birefringent fiber situated downstream from the filter, and disposed with polarization axes that are aligned relative to the first fiber.

The invention further provides a method of limiting noise in the "zeros" of optical RZ signals, said method comprising:

a step of mutually spectrally offsetting the signals as a function of their intensity; and a step of filtering the offset signals, so that the attenuation applied by the filter to the signals corresponding to a "zero" value is greater than the attenuation applied by the filter to the signals corresponding to a "one" value.

Preferably, the attenuation applied by the filter to the signals corresponding to a "zero" value is at least 6 dB greater than the attenuation applied by the filter to the signals corresponding to a "one" value.

In one implementation, the offsetting step comprises injecting the signals into a birefringent fiber. This fiber advantageously has birefringence of greater than or equal to $1\times10^{-5}$.

It is also possible to provide a step of amplifying the signals before the offsetting step.

In one implementation, the method further comprises a step of passing the signals through a birefringent fiber after the filtering step.

BRIEF DESCRIPTION OF THE DRAWINGS

Other characteristics and advantages of the invention will appear on reading the following description of embodiments of the invention given by way of example and with reference to the accompanying drawings in which:

FIG. 1 is a diagram showing the spectrum of the pulses of an signal;

FIG. 2 is a diagram showing apparatus of the invention;

FIG. 3 is a diagram showing the spectra of the signals of FIG. 1 after they have passed through a birefringent fiber;

FIG. 4 diagram showing RZ pulses; and

FIG. 5 is a diagram showing the corresponding pulses at the output of the apparatus of the invention.

MORE DETAILED DESCRIPTION

In order to reduce noise in zeros, the invention proposes to generate a spectrum offset between RZ signals as a function of their intensity, prior to filtering them. The spectrum offset and the filter are chosen so that the pulses corresponding to "ones" pass through the filter, and so that the filter reduces the amplitude of the "zeros". The invention thus makes it possible to reduce the noise in the "zeros" significantly. In order to apply a spectrum offset to the pulses as a function of their intensity, the invention proposes to trap the pulses propagating in the polarization directions of a birefringent optcial fiber. As indicated above, this trapping appears only above a certain intensity threshold.

FIG. 1 is a diagram showing the spectrum of the pulses of an RZ signal. Frequency is plotted along the x-axis, and power spectrum density is plotted up the y-axis. As is conventional for an RZ signal, the "ones" are represented by a pulse with a peak of high intensity, shown in fine lines in the figure, and the "zeros" are represented by an absence of pulse. As shown in the figure in bold lines, pulses with peaks of lower intensity do nevertheless appear in the "zeros". As explained above, one of the objects of the invention is to reduce the intensity of these peaks further.

FIG. 2 is a diagram showing apparatus of the invention. It essentially comprises means 4 for mutually spectrally offsetting the RZ signals, as a function of their intensity. The signals output by the means 4 are transmitted to a filter 6. In the embodiment shown in FIG. 1, an amplifier 2 is provided upstream from the means 4, and means 8 for spectrally offsetting the filtered pulses are provided downstream from the filter. The amplifier is an amplifier of a type known per se, and the structure of the filter is described below.

The means 4 advantageously comprise a birefringent fiber, in which the signals are injected in a direction that bisects or substantially bisects the two polarization directions, so as to generate pulses that propagate in both polarization directions. This fiber advantageously has birefringence greater than or equal to $1\times10^{-5}$.

As explained above, below a certain input pulse intensity, the two pulses propagate at different speeds, and two pulses are obtained at the output of the fiber, one in each polarization direction, which pulses are time offset, and spectrally at the frequency of the input RZ signals.

In contrast, above a certain intensity, the Kerr effect causes the pulses in the two polarization directions to be trapped. The pulses output from the fiber then coincide in time, but they are mutually offset spectrally.

By appropriately choosing the birefringent fiber and, where applicable, by previously amplifying the signals by means of the amplifier 2, it is possible to ensure that the signals corresponding to "zeros" are not trapped in the birefringent fiber, and that the signals corresponding to "ones" are trapped. The corresponding intensity threshold is given in the above-mentioned articles by C. R. Menyuk and M. N. Islam. The intensity required to ensure mutual trapping in a birefringent fiber is easy to determine experimentally, by analyzing the spectrum and time positions of pulses injected into the birefringent fiber.

For example, the fiber may have the following characteristics:

dispersion: 8.75 ps/nm/km;
birefringence equal to $2.4\times10^{-5}$;
length: 20 m; and
effective area: 50 $\mu m^2$.

This fiber makes it possible to achieve a spectrum offset of at least 1 THz for pulses corresponding to "ones". In such a fiber, the threshold intensity for achieving trapping of the components of a pulse in the two polarization directions is 42 pJ. The power required may, for example, be obtained by means of the amplifier placed upstream from the fiber 4. These values are given for pulses of time width of about 300 femtoseconds.

For soliton pulses, the choice of the birefringent fiber may also be made on the basis of the following considerations: the principle of the spectrum splitting in the birefringent fiber is based on the non-linearity of propagation in this segment of fiber. The following two proportionality relationships lie at the basis of this process:

$Zo \sim T^2/(\lambda^2.D)$
$Po \sim \lambda.Seff/Zo$ where:

Zo is the soliton period;
Po is the soliton power;
T is the time width of the pulses;
$\lambda$ is the wavelength of the pulses;
D is the dispersion of the fiber; and
Seff is the effective area of the fiber.

Given these relationships, it is possible to cause the characteristics of the fiber or of the pulses to vary, while conserving the desired trapping property. For example, when the effective area Seff of the fiber is decreased by a ratio of 2 (from 50 $\mu m^2$ to 25 $\mu m^2$, for example), it is possible to ease the constraint on the threshold power to be injected into the segment of fiber by a ratio of 2 as well: in the example of the fiber given above, it is possible to inject 21 pJ on each of the main axes.

In the same way, if the constraint on the length of the fiber is to be eased, it is necessary to reduce Zo, i.e. either to reduce the time width of the pulses T or to increase the dispersion of the fiber D. But it is also necessary, in parallel, to increase the injected power or else to reduce the effective area of the birefringent fiber Seff. It is also possible to cause the time width (the value T in the above formulae) to vary so as to control the other parameters correspondingly.

In all cases, it is the non-linearity of the phenomenon which governs what is possible, i.e. the above two analytic expressions. Thus, the injected power is proportional to the effective area, and inversely proportional to the soliton period Zo. In other words, the injected power is proportional to the dispersion and inversely proportional to the square of the time width of the pulses.

The length of the birefringent fiber is thus preferably about a few (typically 5 or 6) times Z; it is proportional to the square of the width of the pulses and inversely proportional to the dispersion. Naturally the intensity of the phenomenon used by the invention is also proportional to the birefringence of the fiber.

These considerations can be used to determine the characteristics of the fiber, given the pulses used.

FIG. 3 is a diagram showing the spectra corresponding to those of FIG. 1, at the output of the birefringent fiber. Fine lines are used to draw the spectra of the two simultaneous but frequency-offset pulses which are obtained for the "one" of FIG. 1. Bold lines are used to show one of the two pulses that corresponds to the zero of FIG. 1.

The invention proposes to use the spectrum offset between the "zeros" and the "ones" to filter out the noise from the "zeros". For this purpose, a filter 6 for filtering the "zeros" is provided at the output of the birefringent fiber. For example, this filter may be a notch filter which is centered on the frequency of the RZ signals applied to the birefringent fiber, and which has a width such that it passes the spectrally-offset puses, i.e. the "ones". For example, a half-height filter width of 0.4 THz may be chosen. In which case, the attenuation applied to the pulses corresponding to "zeros" is at least 6 dB greater than the attenuation applied to the pulses corresponding to the "ones". At the output of the notch filter, two spectrally-offset synchronous pulses are recovered for each of the "ones" injected into the optical fiber.

It remains possible, in this case, to provide means 8 for reversing the spectral offset of the filtered pulses after the filter. For this purpose, it is possible to use a second segment of birefringent fiber, with polarization axes aligned with those of the first fiber, but reversed relative thereto. It is possible simply to take a same-length segment of the same fiber, and to offset the polarization axes by 90°. The two spectrally-offset synchronous pulses are injected into the second fiber. Using the principle of "reverse light return" that is well known in optics, after being injected into the second fiber, the two spectrally-offset synchronous pulses are output therefrom in the form of a single pulse, with characteristics that are entirely similar to the characteristics of the initial pulse penetrating into the first fiber.

This reverse spectral offsetting of the pulses can be obtained either by the geometrical position of the second segment of fiber, as explained above, or else by choosing a different second segment of fiber, with different dispersion and different birefringence. In any event, the output of the fiber 8 delivers a pulse that has the characteristics of the initial pulse penetrating into the first fiber.

It is also possible to use a high-pass or low-pass filter at the output of the birefringent fiber, which filter attenuates the signals around the center frequency of the input signals, and passes the signals trapped in one of the polarization directions; the difference compared with the preceding embodiment is that, in this case, a stream of single pulses only is recovered, and not a stream of double pulses. Compared with the initial stream of pulses, a stream of pulses that is frequency offset is recovered at the output. FIG. 4 is a diagram showing RZ pulses. Time or length along a transmission system is plotted along the x-axis, and intensity is plotted up the y-axis. The figure shows five bits, with successive transmitted values of 1, 0, 1, 1, and 0, going from right to left in the figure. As explained above, noise can be seen in the "zeros" of the signal in FIG. 4, i.e. the signal is not zero in the time intervals corresponding to "zeros".

FIG. 5 is a diagram showing the results of the stream of pulses shown in FIG. 4 passing through apparatus of the invention, with a fiber 8 for recombining the pulses; the axes are the same as in FIG. 4. As shown in FIG. 5, the high-intensity pulses corresponding to "ones" are not modified by passing through the apparatus of the invention; in contrast, after they have passed through the apparatus, the low-intensity pulses corresponding to "zeros" have intensity that is substantially zero, as shown in bold lines in FIG. 5.

At the output of the apparatus of the invention, an RZ signal is thus obtained that is identical in content to the input signal, but in which the noise of the "zeros" has been eliminated or considerably reduced.

Naturally, the present invention is not limited to the embodiments described and shown, but rather numerous variants of it are accessible to the person skilled in the art. Thus, although the articles by C. R. Menyuk and M. N. Islam mention the case of soliton signals, the invention is applicable to other types of RZ signals, whose components in the polarization directions of a birefringent fiber can, like the solitons, be trapped by phase cross-modulation.

Finally, the intensity values of the pulses at the input of the birefringent fiber and the birefringence values of the fiber are given merely by way of example. Different values may be chosen so as to distinguish between "zeros" and "ones" in any given transmission system. In such a case, the birefringence and the other characteristics of the fiber may be chosen as a function of the spectral offset to be applied; the intensity of the pulses corresponding to "ones" is then chosen so as to ensure that the "ones" are mutually trapped. The threshold can be determined experimentally by the person skilled in the art by measuring the time positions and the spectrum positions of the injected pulses.

What is claimed is:

1. Apparatus for limiting noise in the "zeros" of optical RZ signals, comprising means for mutually spectrally offsetting the signals as a function of their intensity, and a filter for filtering the offset signals, the attenuation applied by the filter to the signals that correspond to a "zero" value being greater than the attenuation applied by the filter to the signals that correspond to a "one" value.

2. Apparatus according to claim 1, wherein the attenuation applied by the filter to the signals corresponding to a "zero" value is at least 6 dB greater than the attenuation applied by the filter to the signals corresponding to a "one" value.

3. Apparatus according to claim 1, wherein the means for spectrally offsetting the signals comprise a birefringent fiber.

4. Apparatus according to claim 3, wherein the fiber has birefringence of greater than or equal to $1 \times 10^{-5}$.

5. Apparatus according to claim 1, wherein the filter is a notch filter centered on the center frequency of the RZ signals.

6. Apparatus according to claim 1, further comprising an amplifier whose output is connected to the offsetting means.

7. Apparatus according to claim 3, further comprising a second birefringent fiber situated downstream from the filter, and disposed with polarization axes that are aligned relative to the first fiber.

8. A method of limiting noise in the "zeros" of optical RZ signals, said method comprising:

a step of mutually spectrally offsetting the signals as a function of their intensity; and a step of filtering the offset signals, so that the attenuation applied by the filter to the signals corresponding to a "zero" value is greater than the attenuation applied by the filter to the signals corresponding to a "one" value.

9. A method according to claim 8, wherein the attenuation applied by the filter to the signals corresponding to a "zero" value is at least 6 dB greater than the attenuation applied by the filter to the signals corresponding to a "one" value.

10. A method according to claim 8, wherein the offsetting step comprises injecting the signals into a birefringent fiber.

11. A method according to claim 10, wherein the fiber has birefringence of greater than or equal to $1 \times 10^{-5}$.

12. A method according to claim 8, further comprising a step of amplifying the signals before the offsetting step.

13. A method according to claim 10, further comprising a step of passing the signals through a birefringent fiber after the filtering step.

* * * * *